United States Patent [19]
Kamiya

[11] Patent Number: 5,717,746
[45] Date of Patent: Feb. 10, 1998

[54] DESIGNATED CHANNEL TERMINATING METHOD AND APPARATUS

[75] Inventor: Masao Kamiya, Tokyo, Japan

[73] Assignee: NEC Corporation, Tokyo, Japan

[21] Appl. No.: 365,002

[22] Filed: Dec. 28, 1994

[30]  Foreign Application Priority Data

Dec. 28, 1993  [JP]  Japan .................................. 5-349276

[51] Int. Cl.$^6$ ........................... H04M 3/00; H04M 15/00; H04M 7/00
[52] U.S. Cl. .................... 379/196; 379/127; 379/233; 379/246
[58] Field of Search ................... 379/142, 245, 379/246, 244, 243, 196, 192, 233, 127, 198

[56]  References Cited

U.S. PATENT DOCUMENTS

| | | | |
|---|---|---|---|
| 4,850,012 | 7/1989 | Mehta et al. | 379/157 |
| 5,023,868 | 6/1991 | Davidson et al. | 370/62 |
| 5,200,994 | 4/1993 | Sasano et al. | 379/142 |
| 5,268,958 | 12/1993 | Nakano | 379/211 |
| 5,425,089 | 6/1995 | Chan et al. | 379/183 |
| 5,436,957 | 7/1995 | McConnell | 379/88 |
| 5,452,346 | 9/1995 | Miyamoto | 379/142 |
| 5,572,585 | 11/1996 | Tsutsui | 379/233 X |

FOREIGN PATENT DOCUMENTS 1-165194   6/1989   Japan .

*Primary Examiner*—Harry S. Hong
*Attorney, Agent, or Firm*—Foley & Lardner

[57]  ABSTRACT

In a designated channel terminating method and apparatus, a B channel to which a call is to be terminated is determined by referring to a registration table in terminating processing of the call. Telephone numbers are registered in the registration table upon registration/designation by subscribers via subscriber circuits or registered by a registering operation through a terminal in a switching center. The method includes a permission/exclusion selecting step and a preferential/absolute selecting step. In the permission/exclusion selecting step, it is checked whether a purpose of registration with respect to said registration table is to designate a B channel to which a call from a specific calling party is to be terminated or designate a B channel to which the call should not be terminated. In the preferential/unconditional processing selecting step, it is determined whether B channel designation is to be preferentially or absolutely processed.

14 Claims, 9 Drawing Sheets

DESIGNATED CHANNEL TERMINATING METHOD AND APPARATUS

BACKGROUND OF THE INVENTION

The present invention relates to a designated channel terminating method for ISDN subscriber switching facilities and, more specifically, a designated channel terminating method and apparatus which determine a B channel for which terminating processing is to be performed, by using a calling party number as a key as well as a called party number.

In conventional ISDN subscriber switching facilities, in determining a terminating circuit, only a called party number is used as a clue.

For example, FIG. 9A shows a basic telephone switching function. In this case, in connecting a subscriber A to a subscriber B, only a telephone number Nb of the subscriber B is used to determine a terminating circuit. That is, in connecting a circuit between an originating subscriber switching center 1 and a terminating subscriber switching center 2, a terminating circuit X for the subscriber B is determined by analyzing the telephone number Nb of the subscriber B.

FIG. 9B shows a telephone switching function using sub-addresses in an ISDN. In this case, in connecting a subscriber A to an end subscriber, a sub-address Nc of an end subscriber C is used as well as a telephone number of a subscriber B. That is, in a terminating subscriber switching center 2, the telephone number Nb of the subscriber B is used to determine a terminating circuit X for the subscriber B. In addition, in switching facilities (a private branch exchange (PBX) facilities and the like) for the subscriber B, the sub-address Nc of the end subscriber C is used to determine a terminating circuit Y for the end subscriber C.

Like an ISDN subscriber, one terminating circuit may have a plurality of terminating channels. In this case, a specific channel for which terminating processing is to be performed is determined by a fixed logic or the like in the terminating subscriber switching center 2.

As described above, according to a conventional terminating circuit determination logic using only a terminating number, or a fixed terminating channel determination logic in a terminating subscriber switching center, if one subscriber has a plurality of channels for which terminating processing can be performed, like an ISDN subscriber, a terminating subscriber cannot arbitrarily determine a terminating channel on the basis of the calling party number of an originating subscriber.

FIG. 10 shows a case for explaining such a problem. In this case, in connecting a subscriber A to a subscriber B, a terminating subscriber switching center 2 determines a terminating circuit X by using a telephone number Nb of the subscriber B, which is dialed by the subscriber A. However, the terminating circuit X has two channels B1 and B2 for which terminating processing can be performed, and the calling party number of the originating subscriber is not used to select one of the channels. This problem may be solved by terminal facilities. In this method, however, B channel designation cannot be performed with respect to a call from a calling party who is executing a calling party number notification inhibiting function.

SUMMARY OF THE INVENTION

The present invention has been made in consideration of the above situation, and has as its object to arbitrarily designate a terminating channel when a plurality of channels for which terminating processing can be performed are present on the terminating side.

In order to achieve the above object, according to the present invention, there is provided a designated channel terminating method of determining a B channel, to which a call is to be terminated, by referring to a registration table in terminating processing of the call, the registration table having telephone numbers registered therein upon registration/designation by subscribers via subscriber circuits or registered by a registering operation through a terminal in a switching center, the method comprising the permission/exclusion selecting step of checking whether a purpose of registration with respect to the registration table is to designate a B channel to which a call from a specific calling party is to be terminated or designate a B channel to which the call should not be terminated, and the preferential/absolute selection step of determining whether B channel designation is to be preferentially or absolutely processed.

If a terminating B channel is temporarily determined as a terminating channel, and a calling party is registered for the temporarily determined B channel as a terminating channel, the channel is formally determined as a terminating channel. If the calling party is not registered for the temporarily determined B channel as a terminating channel but is registered for another B channel, the call is terminated to this B channel. If the calling party is not registered for either channel, the call is terminated to the temporarily determined channel.

DESCRIPTION OF THE PREFERRED EMBODIMENTS

Figure 1:
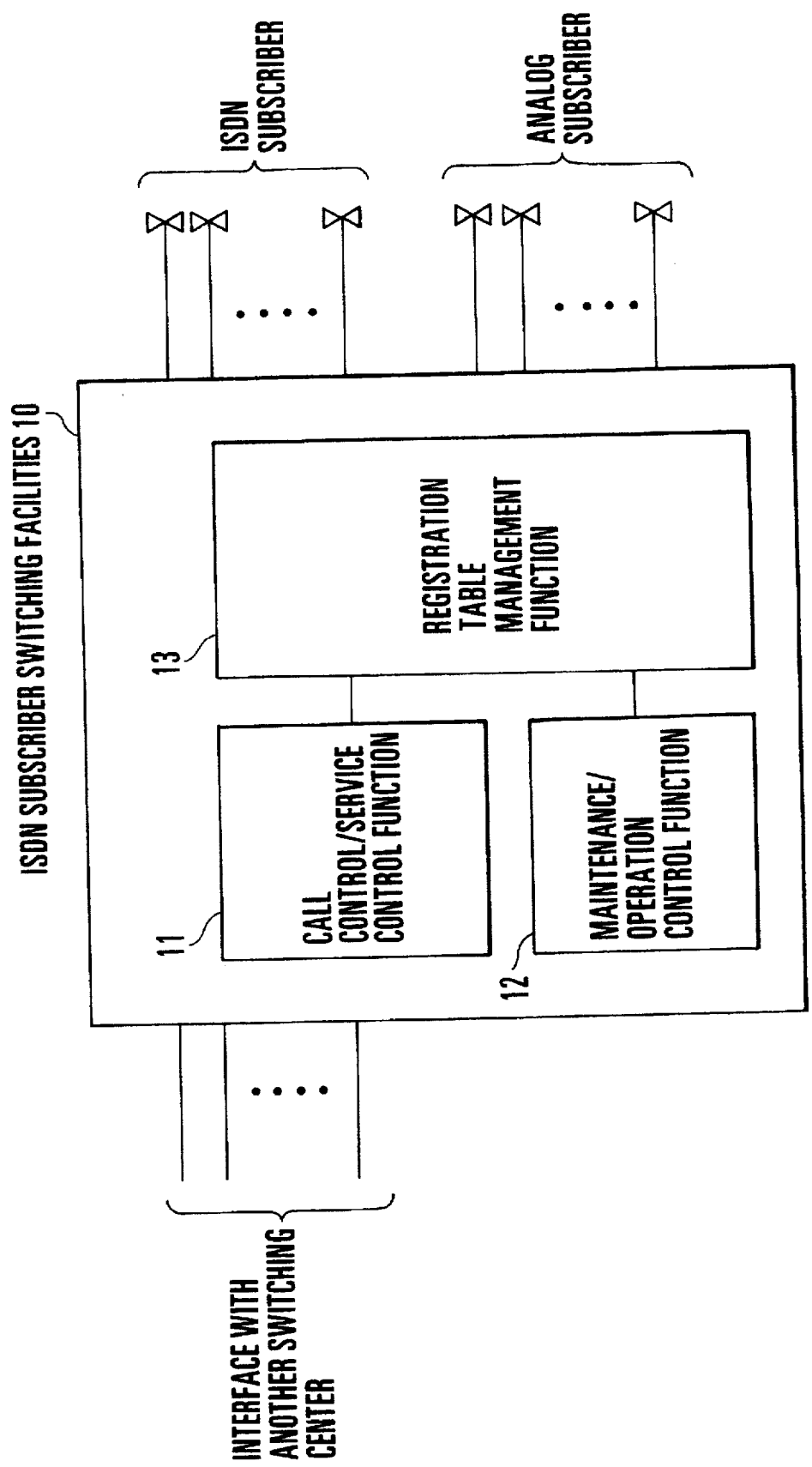
FIG. 1 is a block diagram showing an embodiment of an apparatus to which the present invention is applied.
Figure 2:
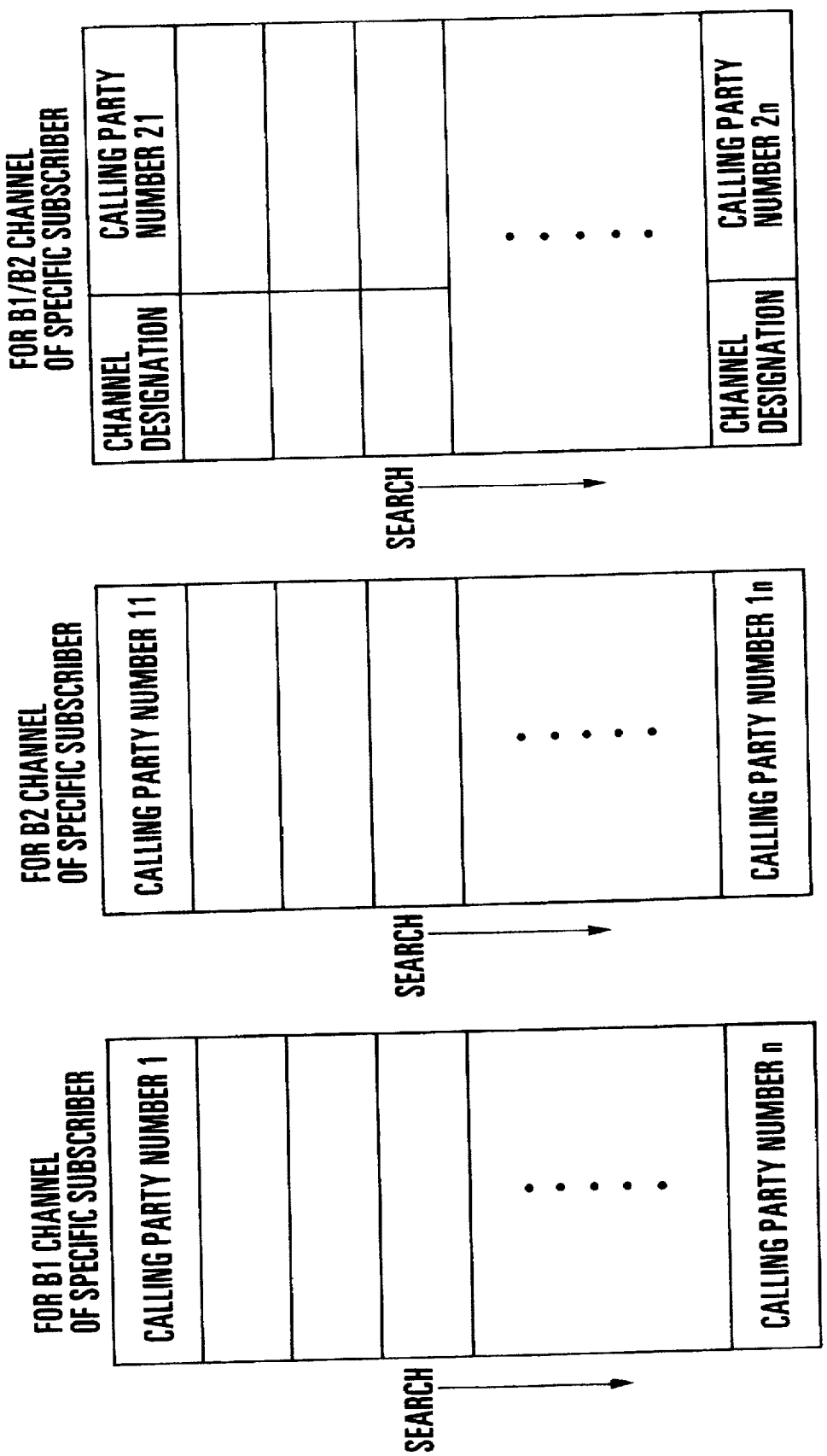
FIGS. 2A, 2B and 2C are views showing calling party number registration tables used for the apparatus.

FIG. 1 shows an apparatus to which the present invention is applied. Referring to FIG. 1, ISDN subscriber switching facilities 10 are constituted by a call control/service control function 11, a maintenance/operation control function 12, and a registration table management function 13. The calling party number registration tables shown in FIGS. 2A and 2B are stored in the registration table management function 13. A terminating B channel is determined in accordance with these calling party number registration tables, as will be described later. FIG. 2A and FIG. 2B show calling party number registration tables respectively arranged for the B1 and B2 channels. FIG. 2C shows a common calling party number registration table arranged for both the B1 and B2 channels.

The operation of this apparatus will be described first with reference to the flow charts shown in FIGS. 3 to 5. Assume that the apparatus has the calling party number registration tables shown in FIG. 2A and FIG. 2B, which are respectively arranged for the B1 and B2 channels. These flow charts indicate operations to be performed after determination of a terminating subscriber, but operations before the determination are omitted.

Figure 3:
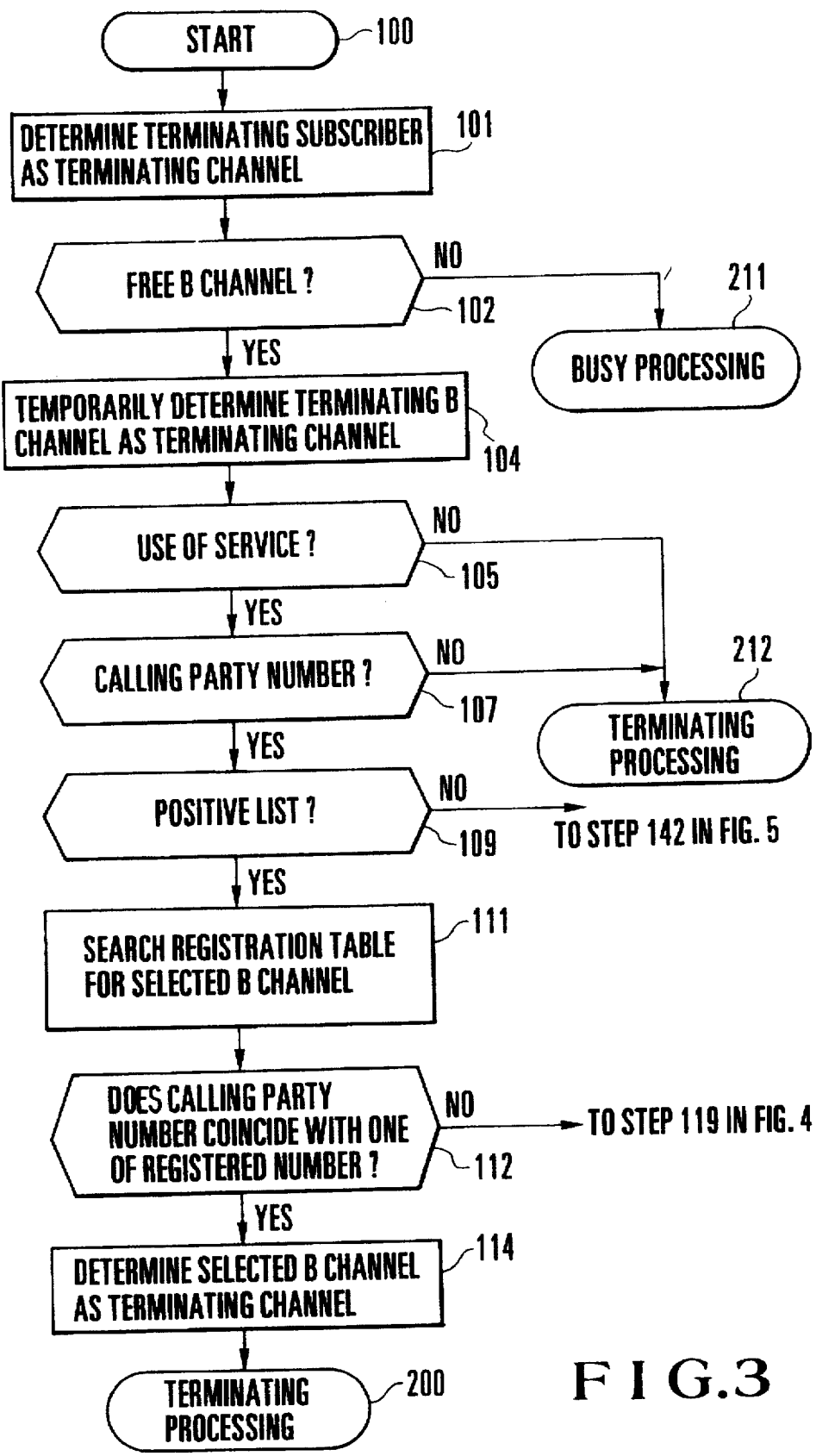
FIG. 3 is a flow chart for explaining the operation of an embodiment using the calling party number registration tables showing in FIG. 2A.
Figure 4:
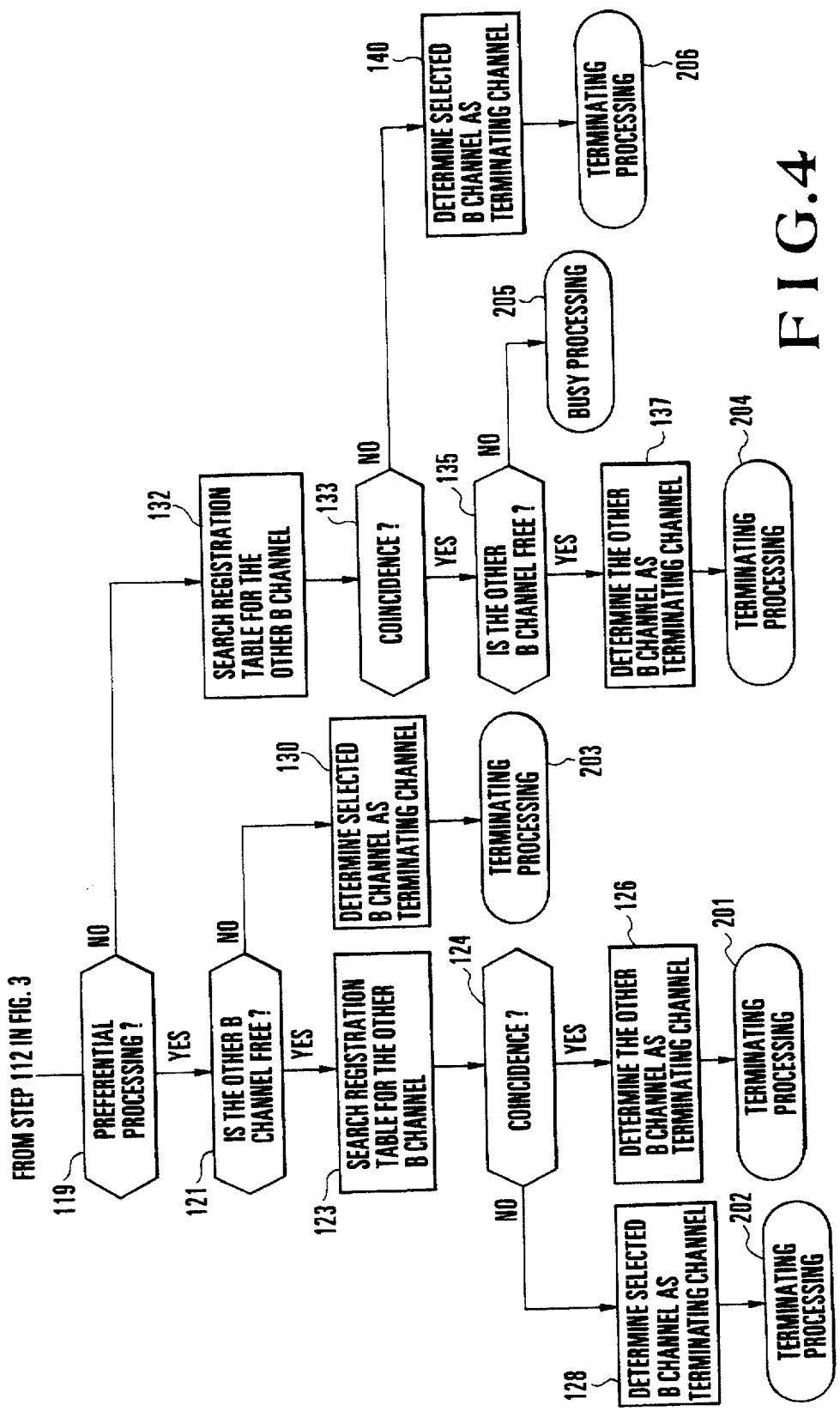
FIG. 4 is a flow chart constituting part of the flow chart shown in FIG. 3.

When a terminating subscriber is determined in step 101 in FIG. 3, it is checked in step 102 whether a free B channel is present. If NO in step 102, "busy processing" in step 211 is performed. If there is a free B channel, YES is obtained in step 102. As a result, "terminating B channel temporary determination" is performed to temporarily determine, e.g., the B1 channel, as a terminating channel in step 104.

Subsequently, in determination processing of "use of service?" in step 105, it is checked whether the terminating subscriber uses a terminating channel determination logic service based on calling party numbers according to the present invention. If this service is not used, NO is obtained in step 105. As a result, "terminating processing" in step 212 is performed to formally select the B channel (B1 channel) temporarily determined as a terminating channel in step 104.

If the terminating channel determination logic service based on calling party numbers is used, YES is obtained in step 105. As a result, it is checked in step 107 whether a calling party number is received. This step is performed because a calling party number may not be received depending on the type of equipment constituting a communication network.

If no calling party number is received, NO is obtained in step 107. As a result, "terminating processing" in step 212 is performed. If a calling party number has already been received, YES is obtained in step 107. As a result, it is checked in step 109 whether a positive list is registered.

In step 109, it is checked whether the calling party numbers of calling parties who are desired to be terminated to the designated B channel (B1 channel) (positive list) are registered in a calling party number registration table, or the calling party numbers of calling parties who are not desired to be terminated (negative list) are registered. If the negative list is determined, NO is obtained in step 109, and the flow advances to step 142 in FIG. 5. If the positive list is determined, YES is obtained in step 109. As a result, step 111 ("SEARCH SELECTED B CHANNEL REGISTRATION TABLE") is performed to search the calling party number registration table arranged for the designated B channel (B1 channel).

Upon completion of this search, it is checked in step 112 whether the received calling party number coincides with one of the registered numbers. If YES in step 112, the selected B channel is determined as a terminating channel in step 114, thereby formally selecting the B channel (B1 channel) which has been temporarily determined as a terminating channel in step 104. Thereafter, the flow advances to "terminating processing" in step 200. If the calling party number does not coincide with any one of the registered numbers upon completion of the search processing, NO is obtained in step 112. As a result, determination processing in step 119 in FIG. 4 is performed.

In "preferential processing?" in step 119, the meaning of registration in the calling party number registration table is determined. That is, a processing route to be taken is determined depending on whether subscribers to be preferentially terminated (or not terminated) to the designated B channel (=preferential processing) or subscribers to be absolutely terminated (or not terminated) to the designated B channel are registered in the calling party number registration table (=absolute processing). If the preferential processing is determined, YES is obtained in step 119. As a result, it is checked in step 121 whether the other channel is free.

If the other channel (B2 channel) is not free, NO is obtained in step 121. As a result, in step 130, the selected B channel is determined as a terminating channel, that is, the B channel (B1 channel) is formally selected, and the flow advances to "terminating processing" in step 203.

If the other B channel is free, YES is obtained in step 121. As a result, in step 123, "other B channel registration table search" is performed to search the calling party number registration table arranged for the other B channel is searched. If the received calling party number coincides with one of the registered numbers upon completion of this search processing, YES is obtained in step 124 ("COINCIDENCE?"). As a result, the other B channel (B2 channel) is determined as a terminating channel in step 126 ("DETERMINE OTHER CHANNEL AS TERMINATING CHANNEL"), and the flow advances to "terminating processing" in step 201. If NO is obtained in step 124, the B channel (B1 channel) is formally selected in step 128 ("DETERMINE SELECTED B CHANNEL AS TERMINATING CHANNEL"), and the flow advances to "terminating processing" in step 202.

If NO is obtained in step 119, and "absolute processing" is performed, the "other B channel registration table search" is performed in step 132 to search the calling party number registration table arranged for the other B channel (B2 channel). If the received calling party number does not coincide with any one of the registered numbers upon completion of the search processing, and NO is obtained in step 133, a terminating channel can be arbitrarily selected. Therefore, the B channel (B1 channel) selected first in step 140 ("DETERMINE SELECTED B CHANNEL AS TERMINATING CHANNEL") is determined as a terminating channel, and the flow advances to "terminating processing" in step 206.

If it is determined, upon completion of the search processing, that the received calling party number coincides with one of the registered numbers, since the calling party number is to be absolutely terminated to the other channel, YES is obtained in step 133. As a result, it is checked in step 135 whether the other channel is free. If the other channel is free, YES is obtained in step 135, and the flow advances to step 137. After step 137 ("DETERMINE THE OTHER CHANNEL AS TERMINATING CHANNEL") is performed to determine the other channel (B2 channel) as a terminating channel, the flow advances to "terminating processing" in step 204. If the other channel is not free, NO is obtained in step 135. In this case, even if the B channel (B1 channel) is free, "absolute processing" is preferentially selected, and the flow advances to "busy processing" in step 205.

Figure 5:
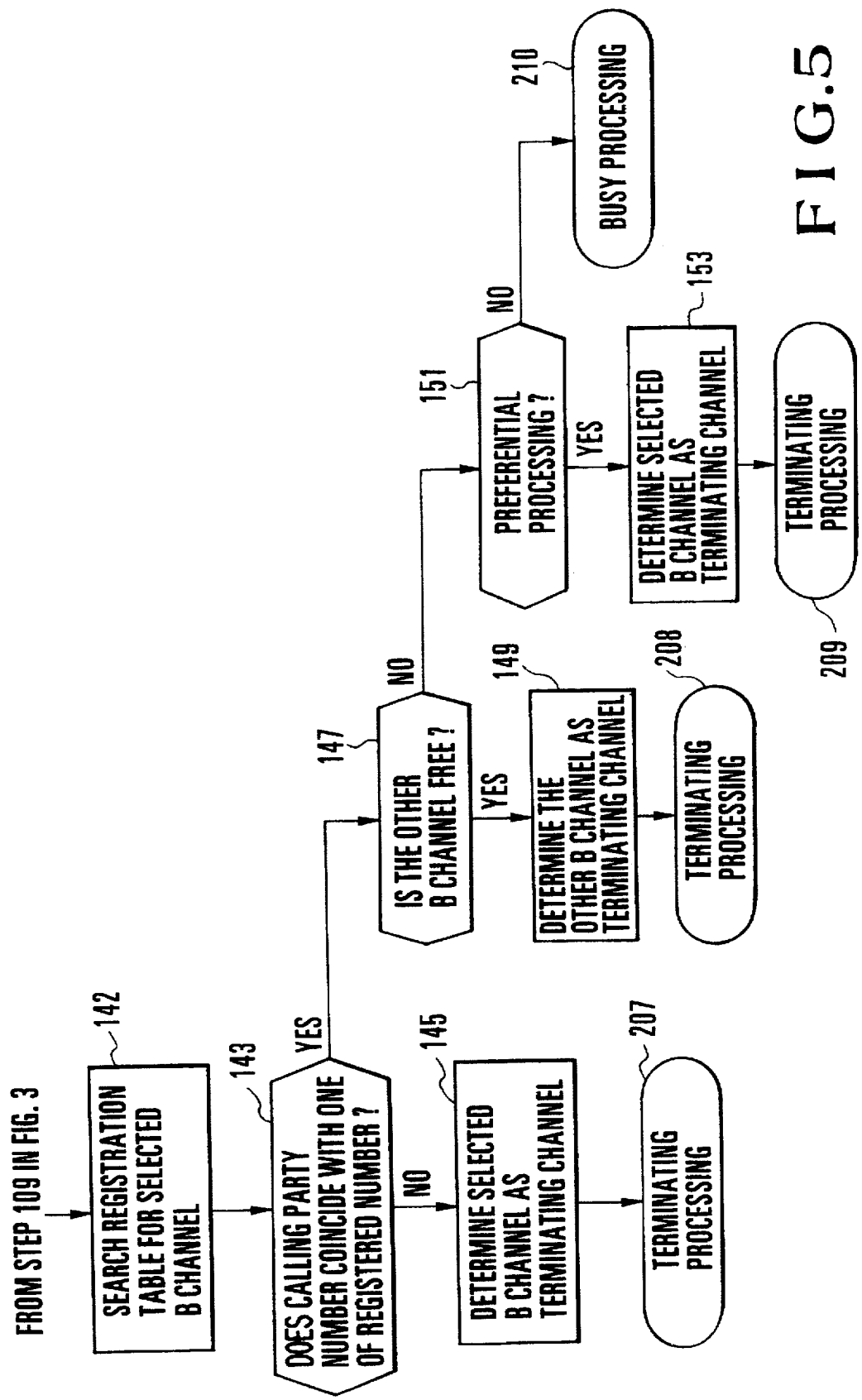
FIG. 5 is a flow chart constituting another part of the flow chart shown in FIG. 3.

If it is determined in step 109 in FIG. 3 that the calling party number registration table is a negative list, step 142 in FIG. 5 ("SEARCH SELECTED B CHANNEL REGISTRATION TABLE") is executed to search the calling party number registration table arranged for the selected B channel. If the received calling party number does not coincide with any one of the registered numbers upon completion of this search processing, NO is obtained in step 143. In this case, since the calling party number can be terminated to the selected B channel, the selected B channel is determined as a terminating channel in step 145, and the flow advances to "terminating processing" in step 207.

If the received calling party number coincides with one of the registered numbers, YES is obtained in step 143. In this case, the other B channel must be preferentially or absolutely selected, and it is checked in step 147 whether the other B channel is free. If the other B channel is free, YES is obtained in step 147. As a result, the other B channel is determined as a terminating channel in step 149, and the flow advances to "terminating processing" in step 208.

If the other B channel is not free, NO is obtained in step 147. The flow then advances to step 151. Step 151 ("PREFERENTIAL PROCESSING?") is performed to check whether the calling party number is preferentially terminated to the initially selected channel. If "preferential processing" is determined in step 151 ("YES"), the calling party number can be terminated to the selected channel. As a result, the flow advances to step 153 ("DETERMINE SELECTED B CHANNEL AS TERMINATING CHANNEL") to determine the initially selected B channel (B1 channel) as a terminating channel, and the flow advances to "terminating processing" in step 209. If "absolute processing" is determined in step 151 ("NO"), the calling party number cannot be terminated to the initially selected channel. As a result, the flow advances to "busy processing" in step 210.

Another embodiment of the present invention will be described next.

Figure 6:
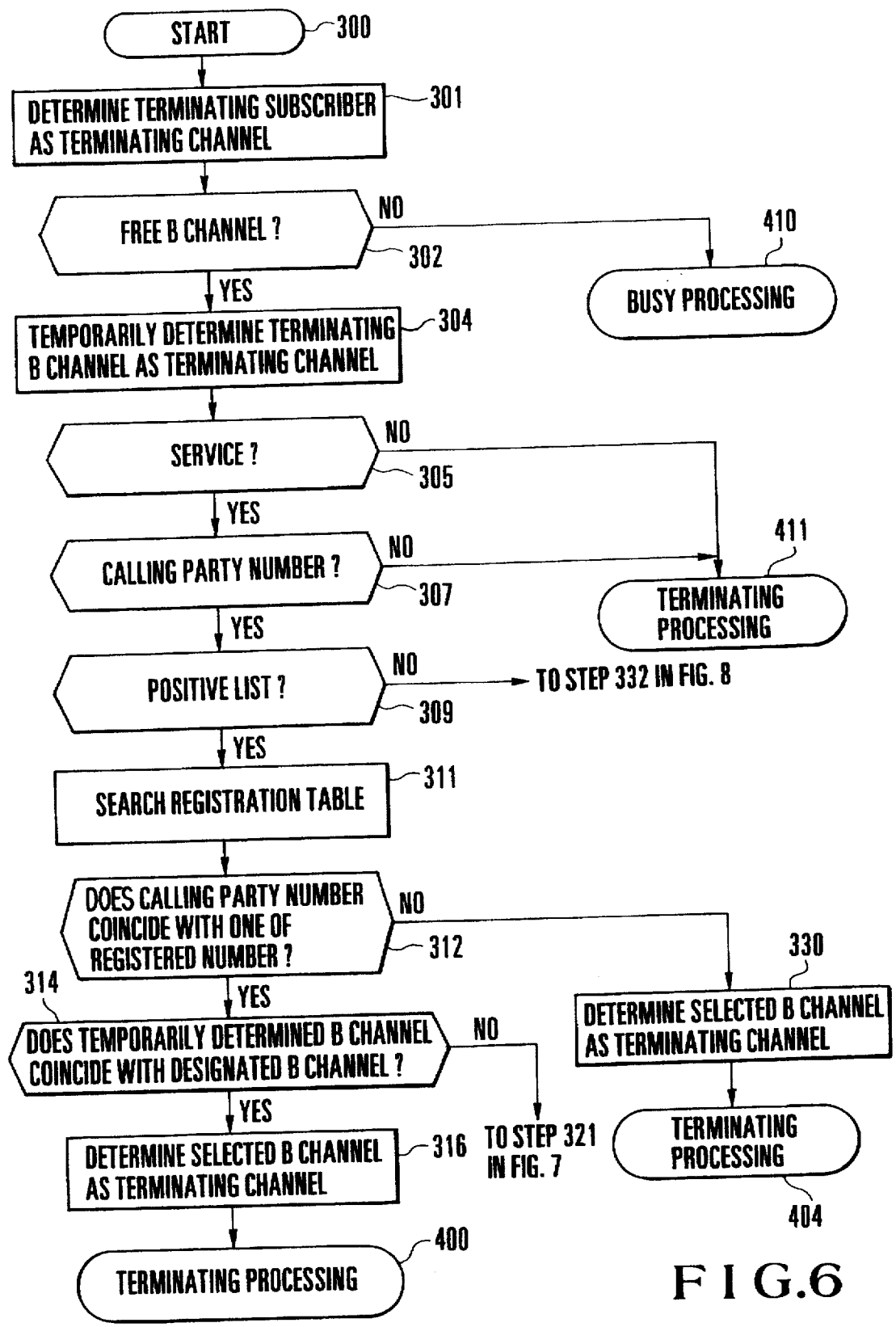
FIG. 6 is a flow chart for explaining the operation of another embodiment using the calling party number registration table shown in FIG. 2B.
Figure 7:
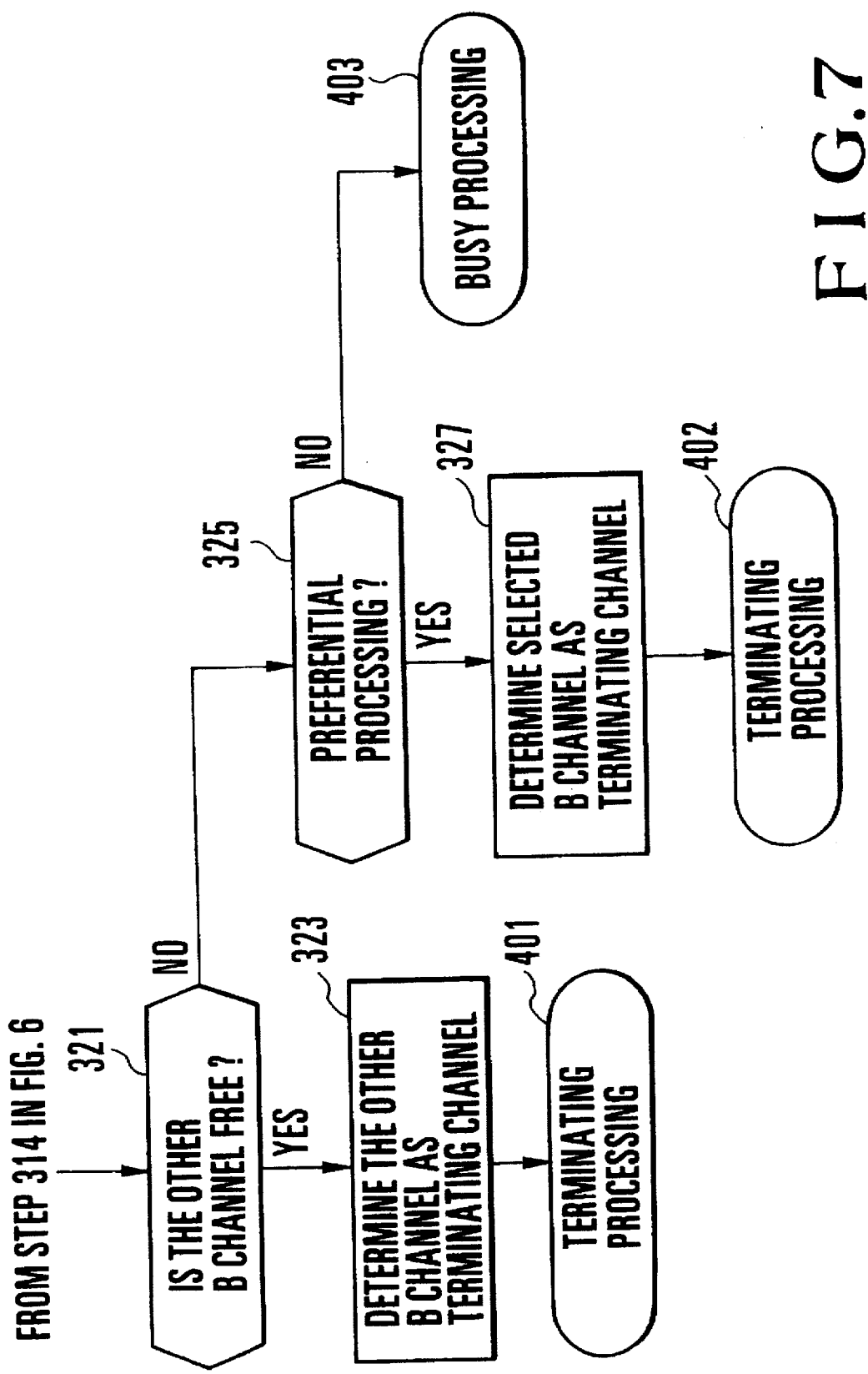
FIG. 7 is a flow chart constituting part of the flow chart shown in FIG. 6.
Figure 8:
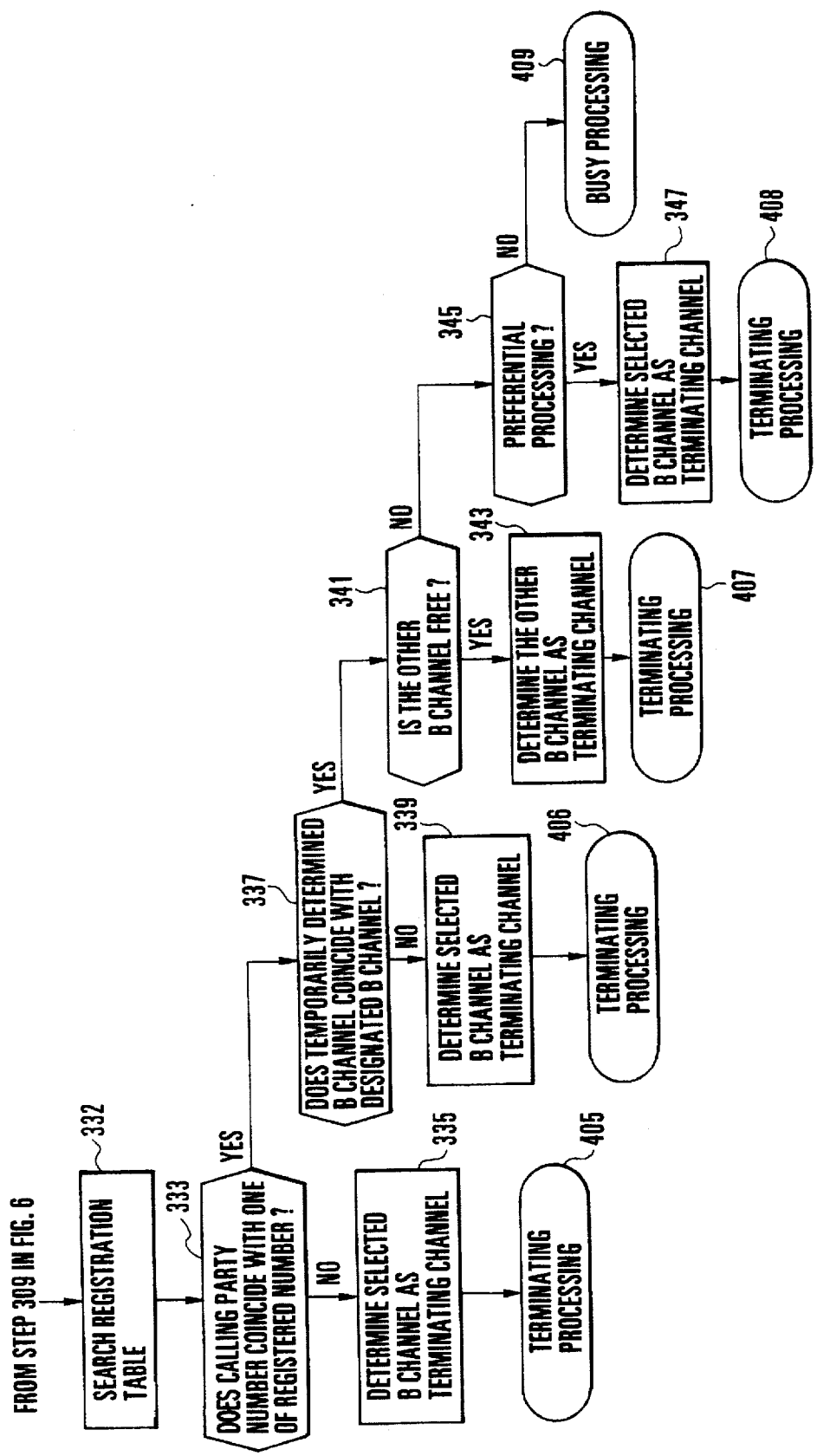
FIG. 8 is a flow chart constituting another part of the flow chart shown in FIG. 6.
Figure 9A:
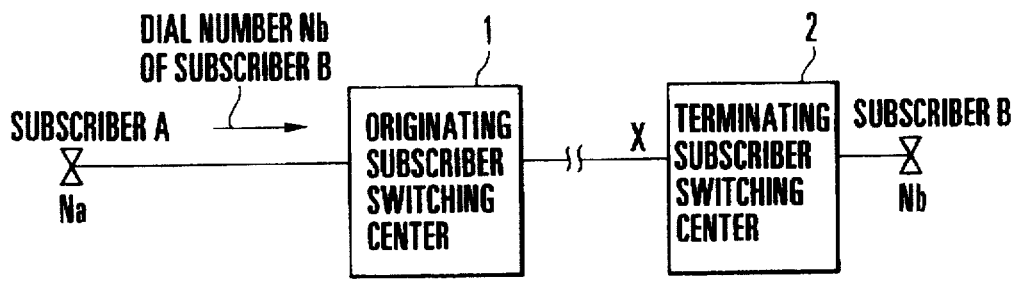
FIGS. 9A and 9B are block diagrams showing conventional apparatuses.
Figure 9B:
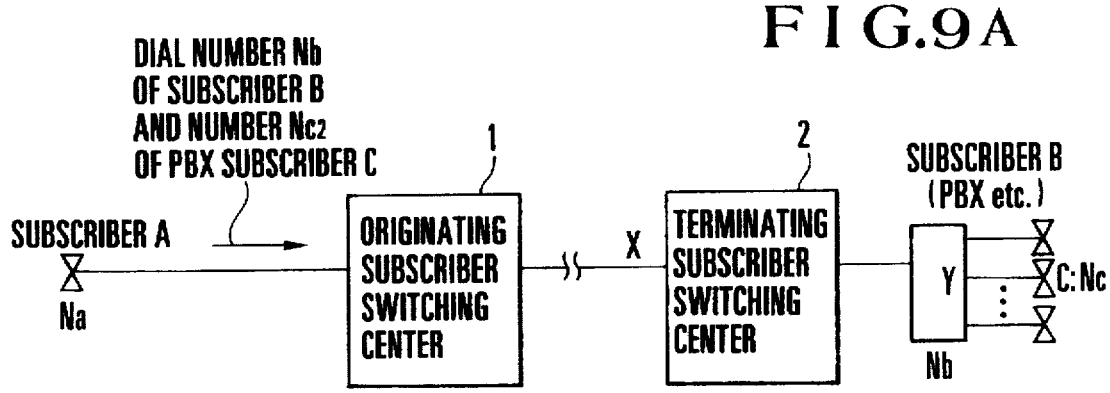
Figure 10:
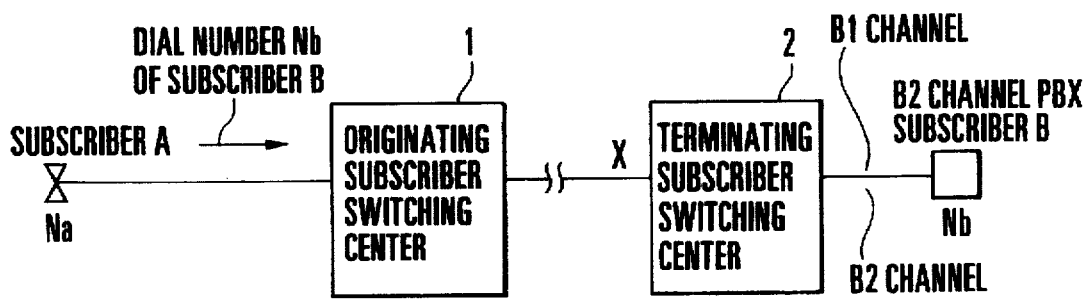
FIG. 10 is a block diagram for explaining problems in the conventional apparatus.

FIGS. 6 to 8 show the operation of the embodiment having the common calling party number registration table shown in FIG. 2C which is arranged for both the B1 and B2 channels.

This embodiment is more complicated than the embodiment having the calling party number registration tables respectively arranged for the B1 and B2 channels in terms of a search method, assurance of a predetermined number of calling party numbers registered for each B channel, and the like.

Only different portions between the operation of the embodiment shown in FIGS. 6 to 8 and that of the embodiment shown in FIGS. 3 to 5 will be described below. The processing from step 301 ("DETERMINE TERMINATING SUBSCRIBER") to step 309 ("POSITIVE LIST?") is the same as that in the previous embodiment. If a positive list is determined, step 311 ("SEARCH REGISTRATION TABLE") is performed to search the common calling party number registration table arranged for both the B1 and B2 channels. If the received calling party number coincides with one of the registered numbers, YES is obtained in step 312. In this case, step 314 ("DOES TEMPORARILY DETERMINED B CHANNEL COINCIDE WITH DESIGNATED B CHANNEL?") is performed to check which one of the B1 and B2 channels is designated. Note that information about designation of a B channel is stored in a channel designation field in the calling party number registration table shown in FIG. 2B.

If the designated B channel coincides with the temporarily determined B channel, YES is obtained in step 314. As a result, the selected B channel is determined as a terminating channel in step 316, and the flow advances to "terminating processing" in step 400. If the designated B channel indicates the other B channel, NO is obtained in step 314. As a result, the flow advances to step 321 in FIG. 7 to terminate the calling party number to the other B channel.

In step 321 in FIG. 7, it is checked whether the other B channel is free. If YES in step 321, step 323 ("DETERMINE THE OTHER B CHANNEL AS TERMINATING CHANNEL") is performed to determine the other B channel as a terminating channel, and the flow advances to "terminating processing" in step 401. If the other B channel is not free, and NO is obtained in step 321, step 325 ("PREFERENTIAL PROCESSING?") is performed.

If "preferential processing" is determined, and YES is obtained in Step 325, the calling party number can be terminated to the initially selected B channel. Therefore, step 327 ("DETERMINE SELECTED B CHANNEL AS TERMINATING CHANNEL") is performed to determine the initially selected B channel as a terminating channel. The flow then advances to "terminating processing" in step 402. If NO is obtained in step 325 and "absolute processing" is to be performed, the flow returns to "busy processing" in step 403.

If, as shown in FIG. 6, NO is obtained in step 312 after step 311 ("SEARCH REGISTRATION TABLE"), the selected B channel is determined as a terminating channel in step 330, and the flow advances to "terminating processing" in step 404.

If it is determined in step 309 that the calling party number registration table is a negative list ("NO"), step 332 ("SEARCH REGISTRATION TABLE" in FIG. 8) is performed to search the common calling party number registration table arranged for both the B1 and B2 channels. If NO is obtained in step 333 ("DOES CALLING PARTY NUMBER COINCIDE WITH ONE OF REGISTERED NUMBERS?"), the selected B channel is determined as a terminating channel in step 335, and the flow advances to "terminating processing" in step 405.

If the received calling party number coincides with one of the registered numbers, and YES is obtained in step 333, it is checked in step 337 whether the temporarily determined B channel coincides with the designated B channel. If NO in step 337, the selected B channel is determined as a terminating channel in step 339, and the flow advances to "terminating processing" in step 406.

If YES in step 337, the flow advances to step 341. The processing in step 341 and the subsequent steps is the same as that in step 147 and the subsequent steps in FIG. 5.

The present invention is not limited to the above embodiments. For example, the apparatus may have a calling party number registration table for only one of the B channels (only the B1 or B2 channel) as a modification of the calling party number registration tables shown in FIGS. 2A and 2B.

A calling party number may be designated and registered in a calling party number registration table by a subscriber via a subscriber circuit or may be registered through a maintenance/operation terminal in a switching center upon a registering operation. That is, in performing registration with respect to a calling party number registration table, one of the B channels may be specified, as subscriber data, for each subscriber, or one of the B channels may be permanently specified as switching facilities.

Whether B channel designation is to be preferentially or absolutely processed may be determined for each subscriber by defining "preferential processing" or "absolute processing" as subscriber data. Alternatively, "preferential processing" or "absolute processing" may be permanently defined as switching facilities and need not be determined by each subscriber.

As has been described above, a calling party number registration table for registration of calling party numbers is newly formed. A received calling party number is compared with the registered contents of the calling party number registration table. With this operation, a B channel to which a call is to be terminated is determined by the permission/exclusion selecting function or preferential/absolute selecting function. Therefore, a call from a specific calling party can be terminated to one or the other B channel in accordance with the intention of the calling party.

What is claimed is:

1. A designated channel terminating method of determining a B channel, to which a call is to be terminated, by referring to a registration table in terminating processing of the call, said registration table having telephone numbers registered therein upon registration or designation by subscribers via subscriber circuits or registered by a registering operation through a terminal in a switching center, the method comprising the steps of:

a permission or exclusion selecting step of checking whether a purpose of registration with respect to said registration table is to designate a B channel to which a call from a specific calling party is to be terminated or designate a B channel to which the call should not be terminated; and a preferential or absolute selecting step of determining whether B channel designation is to be by preferential processing or by absolute processing.

2. A method according to claim 1, wherein said calling party number registration table is arranged for each of B1 and B2 channels.

3. A method according to claim 1, wherein said calling party number registration table is commonly arranged for both B1 and B2 channels.

4. A method according to claim 1, wherein said calling party number registration table is arranged for only one of B1 and B2 channels.

5. A method according to claim 1, wherein exclusion is added as a purpose of registration with respect to a calling party number registration table, so that only a call having a specific calling party number is terminated to the designated B channel.

6. A method according to claim 1, further comprising:

a preferential processing step including, designating a first B channel as a terminating channel when said first B channel is not busy, said first B channel being registered for said specific calling party in said registration table, and designating a second B channel as a terminating channel when said first B channel is busy, said second B channel being unregistered for said specific calling party in said registration table, said preferential processing step being performed when said preferential or absolute selecting step determines said designation by said preferential processing.

7. A method according to claim 1, further comprising:

an absolute processing step of absolutely designating only a specific B channel registered for said specific calling party in said registration table as a terminating channel, when said preferential or absolute selecting step determines said designation by said absolute processing.

8. A method according to claim 7, wherein said absolute processing step comprises a busy processing step for outputting a busy signal to said specific calling party, when said specific B channel is busy.

9. A method according to claim 1, wherein the permission or exclusion selecting step and the preferential or absolute selecting step are performed by a subscriber switching facility connected between said specific calling party and an ISDN network, said ISDN network providing a plurality of allowable connections to a called party to which the call is to be terminated.

10. A designated channel terminating method of determining a B channel, to which a call is to be terminated, by referring to a calling party number registration table in terminating processing of the call, said calling party number registration table being arranged for each subscriber in ISDN subscriber switching facilities, and said calling party number registration table having telephone numbers registered therein upon registration designation by subscribers via subscriber circuits or registered by a registering operation through a terminal in a switching center, the method comprising the steps of:

receiving a calling party number in performing terminating processing;

checking whether calling party numbers registered in said calling party number registration table are calling party numbers of calling parties who are desired to be terminated to a designated B channel or calling party numbers of calling parties who are not desired to be terminated to the designated B channel;

searching said calling party number registration table to check whether there is a calling party number which coincides with a received calling party number, when the calling party numbers registered in said calling party number registration table are calling party numbers of calling parties who are desired to be terminated to the designated B channel; and determining whether B channel designation is to be preferentially or absolutely processed, when it is determined that there is no calling party number, in said calling party number registration table, which coincides with the received calling party number.

11. A method according to claim 10, further comprising the steps of:

searching said calling party number registration table to check whether there is a calling party number which coincides with the received calling party number, when the calling party numbers registered in said calling party number registration table are calling party numbers of calling parties who are not desired to be terminated to the designated B channel; and determining whether B channel designation is to be preferentially or absolutely processed, when it is determined that there is a calling party number, in said calling party number registration table, which coincides with the received calling party number, and the other B channel is not free.

12. A method according to claim 11, wherein said calling party number registration table is arranged for each of a B1 and B2 channel, the method further comprising the steps of:

when the B channel designation is determined to be preferentially processed, and when there is no coincidence in said calling party number registration table for one of said B1 and B2 channel which corresponds to the designated B channel, and when another one of said B1 and B2 channel is free, checking said calling party number registration table for said another one of said B1 and B2 channel to check whether there is a calling party number registered therein which coincides with the received calling party number; and designating a B channel for the call that corresponds to said calling party registration table for said another one of said B1 and B2 channel when there is a coincidence with the received calling party number and one of the calling party numbers registered in said calling party registration table for said another one of said B1 and B2 channel.

13. A method according to claim 10, wherein each of said ISDN subscriber facilities is connected between a calling party corresponding to said calling party number and an ISDN network, said ISDN network providing a plurality of allowable connections to a called party to which a call is to be terminated.

14. A designated channel terminating method for an ISDN network in which a terminating subscriber has already been determined, the method comprising the steps of:

a) determining if one of a B1 channel and a B2 channel is free for use based on an incoming call to the terminating subscriber;

b) temporarily designating the one of the B1 channel and the B2 channel as a temporarily designated B channel for use by the incoming call if the determining step determines that one of the B1 channel and the B2 channel is free for use;

c) determining a calling party number that is received with the incoming call;

d) registering, in a B1 channel calling party registration table, calling parties that desire the B1 channel for use, the registering in the B1 channel calling party registration table being made by one of absolute use of the B1 channel and preferential use of the B1 channel;

e) registering, in a B2 channel calling party registration table, calling parties that desire the B2 channel for use, the registering in the B2 channel calling party registration table being made by one of absolute use of the B2 channel and preferential use of the B2 channel;

f) comparing the calling party number with the calling parties in one of the B1 channel calling party registration table and the B2 channel calling party registration table which corresponds to the temporarily designated B channel to determine if a coincidence exists;

g) permanently designating the temporarily designated B channel as a permanently designated B channel for use by the incoming call based on whether the comparing step determines a coincidence in the corresponding one of the B1 channel calling party registration table and the B2 channel calling party registration table;

h) if the step f) resulted in no coincidence, determining whether the B1 channel calling party registration table and the B2 channel registration table perform registration based on the absolute use or the preferential use of a corresponding B channel;

i) if the step f) resulted in no coincidence, determining if the other B channel that is different from the temporarily designated B channel is free for use;

j) if the step f) resulted in no coincidence and the step i) resulted in the other B channel being determined to be free for use, comparing the calling party number with the calling parties in the other of the B1 channel calling party registration table and the B2 channel calling party registration table when the comparing step does not determine a coincidence in the one of the B1 channel calling party registration table and the B2 channel calling party registration table;

k) if the step f) resulted in no coincidence and the step i) resulted in the other B channel being determined to be free for use, permanently designating the other B channel as the permanently designated B channel for use by the incoming call based on whether the comparing means determines a coincidence in the corresponding one of the B1 channel calling party registration table and the B2 channel calling party registration table;

l) if the step f) and the step k) both resulted in no coincidence, designating the other channel as the permanently designated B channel for use by the incoming call if the registering determination in the step h) is absolute use; and m) if the step f) and the step k) both resulted in no coincidence, designating the temporarily designated channel as the permanently designated B channel for use by the incoming call if the registering determination in the step h) is preferential use.

* * * * *